(12) United States Patent
Vanstone et al.

(10) Patent No.: US 7,209,285 B1
(45) Date of Patent: Apr. 24, 2007

(54) COMMON AXIS THREE MIRROR ANASTIGMATIC OPTIC

(75) Inventors: Gary C. Vanstone, Merritt Island, FL (US); James A. Carter, III, Indialantic, FL (US); Richard A. LeBlanc, Clermont, FL (US); Daniel J. Stoppenbach, Chuluota, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/662,200

(22) Filed: Sep. 11, 2003

(51) Int. Cl.
*G02B 17/00* (2006.01)
*G02B 23/00* (2006.01)

(52) U.S. Cl. .................. 359/366; 359/399; 359/859

(58) Field of Classification Search ........ 359/350–367, 359/725–732, 850–861, 399–430
See application file for complete search history.

(56) References Cited

U.S. PATENT DOCUMENTS

| | | | | |
|---|---|---|---|---|
| 3,527,526 A | * | 9/1970 | Silvertooth ................ 359/859 |
| 4,101,195 A | * | 7/1978 | Frosch et al. ............... 359/366 |
| 4,240,707 A | * | 12/1980 | Wetherell et al. ........... 359/859 |
| 4,265,510 A | * | 5/1981 | Cook .......................... 359/366 |
| 4,598,981 A | * | 7/1986 | Hallam et al. .............. 359/366 |
| 4,632,521 A | * | 12/1986 | Korsch ....................... 359/366 |
| 4,733,955 A | * | 3/1988 | Cook .......................... 359/859 |
| 4,737,021 A | * | 4/1988 | Korsch ....................... 359/366 |
| 4,988,858 A | * | 1/1991 | Pinson ..................... 250/208.1 |
| 5,414,555 A | * | 5/1995 | Chan et al. ................. 359/366 |
| 5,677,788 A | * | 10/1997 | Chen et al. ................. 359/365 |
| 5,862,726 A | * | 1/1999 | Chan et al. .................. 82/1.11 |
| 6,081,578 A | * | 6/2000 | Braat .......................... 378/34 |
| 6,084,727 A | * | 7/2000 | Cook .......................... 359/850 |
| 6,409,352 B1 | * | 6/2002 | Sunaga ....................... 359/859 |
| 6,667,831 B2 | * | 12/2003 | Draganov et al. .......... 359/399 |

* cited by examiner

*Primary Examiner*—Thong Q Nguyen
(74) *Attorney, Agent, or Firm*—Jeffrey D. Myers; Timothy D. Stanley; Peacock Myers P.C.

(57) ABSTRACT

A three mirror anastigmatic optic (and corresponding method of making) comprising a primary mirror, a secondary mirror, a tertiary mirror, and a vertex common to the primary and tertiary mirrors.

17 Claims, 3 Drawing Sheets

COMMON AXIS THREE MIRROR ANASTIGMATIC OPTIC

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field):

The present invention relates to Three Mirror Anastigmatic ("TMA") optics such as employed in TMA telescopes.

2. Description of Related Art

Three Mirror Anastigmatic ("TMA") optics employed with sensor technologies typically require complex alignment techniques, requiring Modulation Transfer Function ("MTF") analyzers, expensive alignment fixtures, and long hours of labor for the system to be aligned. FIG. 4 illustrates a typical prior art TMA optic 2, comprising discrete primary, secondary, and tertiary mirrors 4,6,8, with primary and tertiary mirrors not sharing a common vertex. The alignment and fabrication of TMA's typically require special alignment fixturing, multiple axes and six degrees of freedom for all three mirrors, special alignment techniques and expensive imaging equipment. The present invention permits straightforward alignment using a boresight laser or alignment tool.

BRIEF SUMMARY OF THE INVENTION

The present invention is of a three mirror anastigmatic optic (and corresponding method of making) comprising: a primary mirror; a secondary mirror; a tertiary mirror; and a vertex common to the primary and tertiary mirrors. In the preferred embodiment, all the mirrors share a common alignment axis, and the optic has tilt coincident to the common alignment axis. A stop is at the secondary mirror. A hole exists at a junction of the primary and tertiary mirrors, and the optic undergoes alignment by insertion through the hole of one or both of a rod and a laser. The primary and the tertiary mirrors are preferably diamond turned with a common fixture. An imaging sensor is preferably located at an imaging plane in an optical path following the tertiary mirror and focusing occurs only via movement of the secondary mirror.

The invention is also of an optical system (and corresponding method) comprising a three mirror anastigmatic optic as described. The system is preferably selected from hyperspectral imaging sensors, multispectral imaging sensors, infrared imaging systems, electro-optical targeting systems, and remote sensors.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The common axis Three Mirror Anastigmatic ("TMA") optical apparatus and method of the invention employs primary and tertiary mirrors at a common vertex with tilt coincident to the alignment axis. The stop of the TMA of the invention is at the secondary mirror, which permits the system to be focused with motion only being performed by the secondary mirror and with only a slight positioning alignment for pixel registration being performed at the image plane.

The primary and tertiary mirrors having a common vertex permits the diamond turning of the mirror with a common fixture. The mirrors are preferably diamond turned separately referenced to a flat tooling fixture, and then are cut as two halves. They are pinned together into a single assembly, permitting both to be self aligned. The vertex of both mirrors serves as an alignment datum for the secondary mirror to be aligned to the primary-tertiary mirror assembly.

The present invention employs a wide-field (up to at least approximately 7 degrees), low-distortion (at least less than approximately 1%) design, where all the needed precision of alignment is done during fabrication with the diamond turning machine, with primary and tertiary mirrors fabricated as a single assembly and pre-aligned to each other with the diamond turning machine. The design of the secondary mirror is preferably constrained to focus and tilt, the boresight of the secondary mirror is coincident to the alignment axis, wherein centering is performed with a boresight laser and/or alignment rod. The tilt of the secondary mirror to the primary/tertiary assembly is preferably performed using reflective fiducials (not shown) on both the secondary mirror and the primary/tertiary assembly. A system according to the invention easily achieves F# of approximately 2.3 or better.

Figure 1:
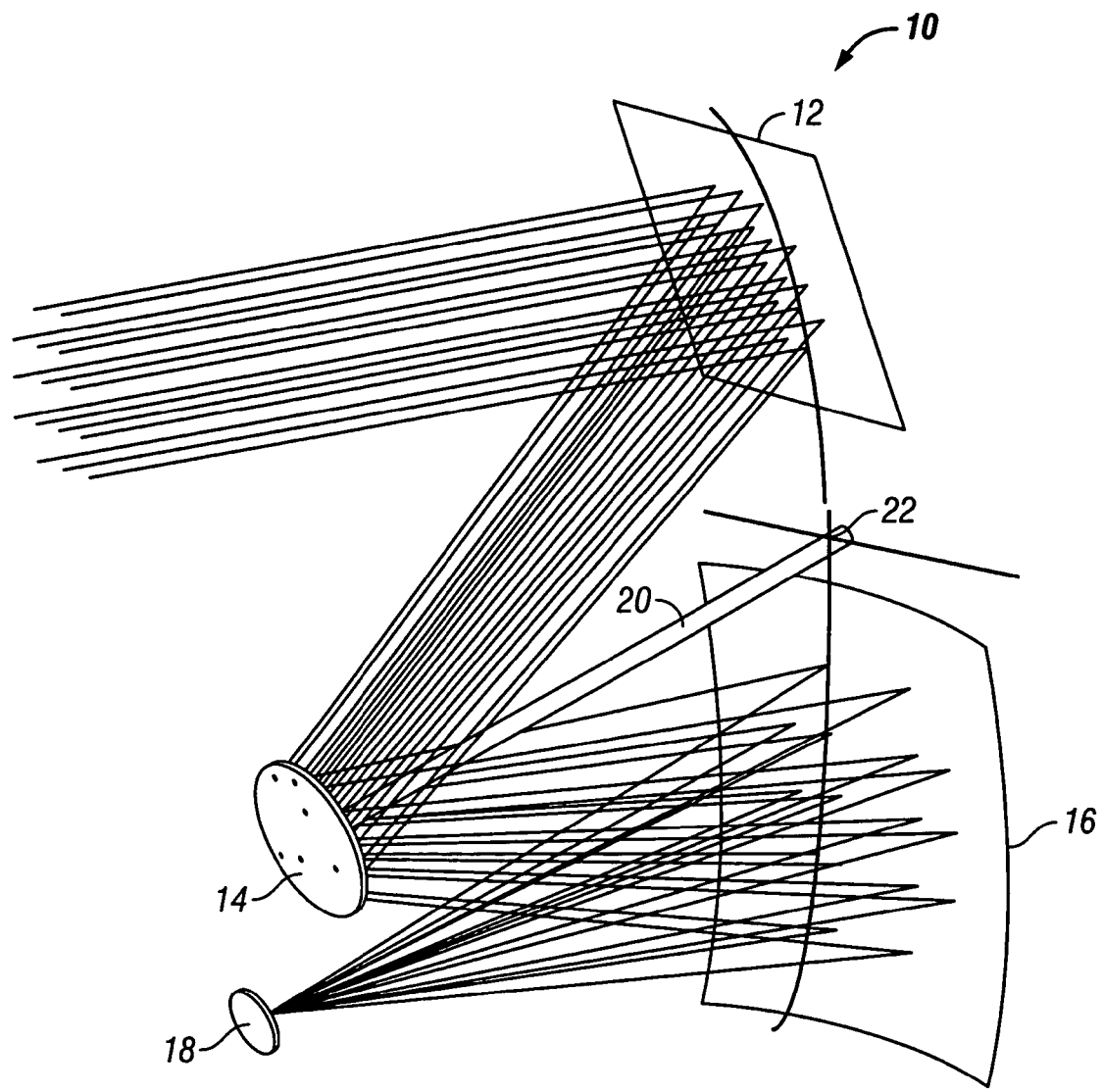
FIG. 1 is a perspective view of the common axis TMA optic of the invention.

The preferred embodiment of the off-axis anastigmatic optic 10 of the invention is shown in FIG. 1, comprising primary mirror 12, secondary mirror 14, tertiary mirror 16 having a focal Point which is off an alignment axis shared by the primary and secondary mirrors, and imaging sensor or optic 18. Alignment axis 20 of the secondary mirror is constrained during alignment to coincide with vertex 22 of both primary and tertiary mirrors.

Figure 2:
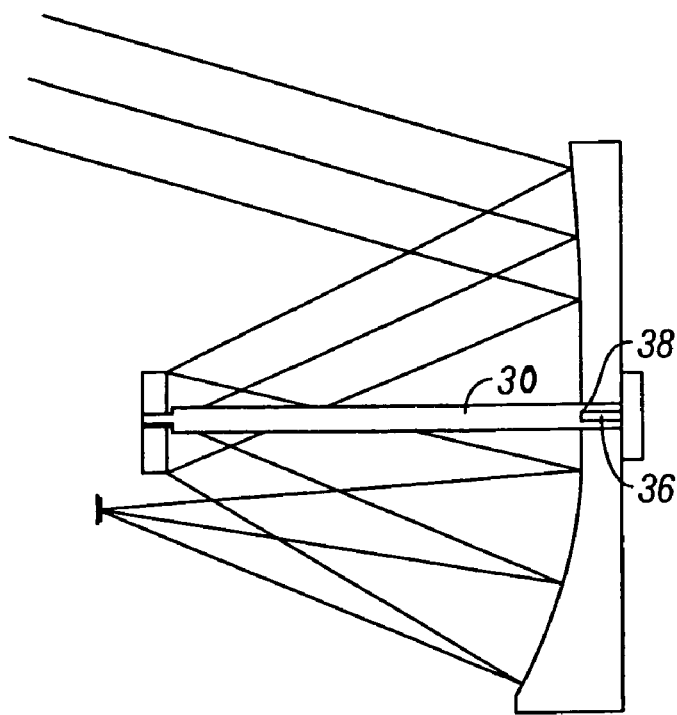
FIG. 2 is a side view of the invention illustrating basic alignment.
Figure 3:
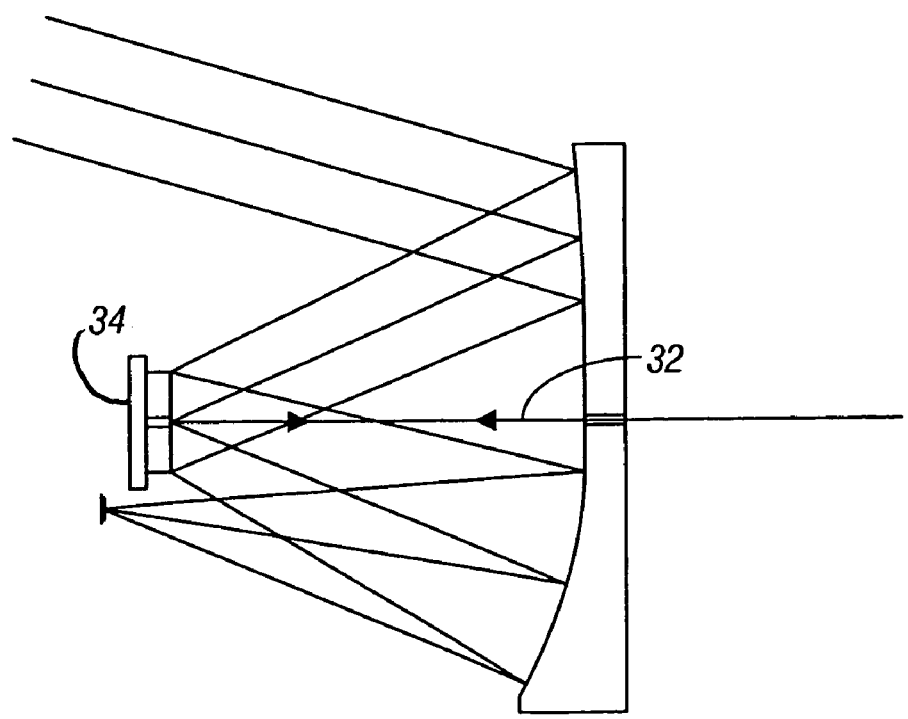
FIG. 3 is a side view of the invention illustrating final alignment.
Figure 4:
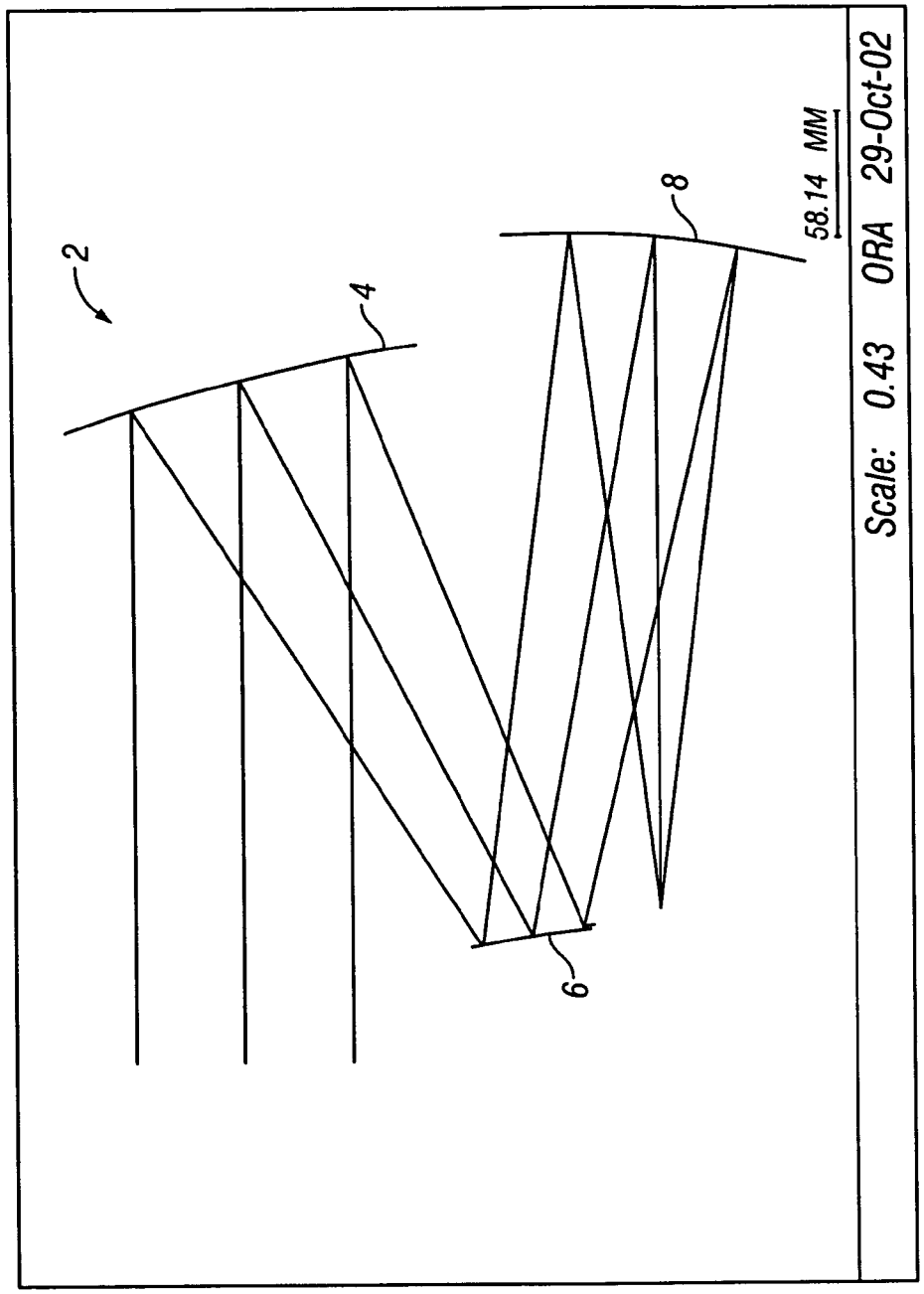
FIG. 4 is a side view of a prior art TMA optic.

As shown in FIG. 2, insertion of the primary mirror is performed with a boresight tool/alignment post 30 to center the secondary mirror with respect to the alignment axis. The boresight tool is preferably a rod (preferably metal) with alignment marks placed through a fabricated hole 36 at the primary/tertiary mirror boundary 38. The secondary mirror is placed at the end of the boresight tool. As shown in FIG. 3, a final alignment may be performed for high precision adjustment of the secondary mirror employing a boresight laser 32 and reflective datum 34.

The only motions needed for the secondary mirror are tilt and translation along the tilt axis. The image plane is only allowed the necessary slight offsets for centering and focus. The primary and tertiary mirrors are prealigned due to their fabrication on the diamond turning machine as a single unit.

The present invention is especially useful for any wideband optical system with high performance requirements, particularly hyperspectral/multispectral imaging sensors, infrared imaging systems, electro-optical targeting systems, and remote sensors.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A three mirror off-axis anastigmatic optic comprising:
    a primary mirror;
    a secondary mirror;
    a tertiary mirror having a focal point which is off an alignment axis shared by all said mirrors; and
    a vertex common to said primary and tertiary mirrors located at a junction of said primary mirror and said tertiary mirror, wherein said alignment axis intersects said vertex; and
    wherein said primary and tertiary mirrors abut one another.

2. The optic of claim 1 having tilt coincident to said common alignment axis.

3. The optic of claim 1 additionally comprising a hole at said junction of said primary and tertiary mirrors.

4. The optic of claim 3 wherein said hole is disposed at an end of said alignment axis to receive, for alignment of said secondary mirror to said primary and tertiary mirrors, insertion of one or both of a rod and a laser.

5. The optic of claim 1 wherein said primary and said tertiary mirrors are diamond turned as a unit.

6. The optic of claim 1 additionally comprising an imaging sensor located at an imaging plane in an optical path following said tertiary mirror.

7. An optical system comprising a three mirror anastigmatic optic according to claim 1.

8. An optical system according to claim 7 selected from the group consisting of hyperspectral imaging sensors, multispectral imaging sensors, infrared imaging systems, electro-optical targeting systems, and remote sensors.

9. A method of making an off-axis three mirror anastigmatic optic, the method comprising the steps of:
    placing primary, secondary, and tertiary mirrors wherein said primary and tertiary mirrors abut one another;
    employing a vertex common to the primary and tertiary mirrors at a junction of the primary and tertiary mirrors; and
    adjusting the mirrors such that an electromagnetic wave reflected from the tertiary mirror is caused to travel to a position near, but not on the secondary mirror.

10. The method of claim 9 wherein the placing step comprises placing all the mirrors such that they share a common alignment axis that intersects the vertex.

11. The method of claim 10 wherein the optic has tilt coincident to the common alignment axis.

12. The method of claim 9 additionally comprising the step of forming a hole at the junction of the primary and tertiary mirrors.

13. The method of claim 12 additionally comprising the step of aligning the secondary mirror with the vertex of the primary and tertiary mirrors by insertion of one or both of a rod and a laser through the hole.

14. The method of claim 9 additionally comprising the step of diamond turning the primary and the tertiary mirrors as a unit.

15. The method of claim 9 additionally comprising the steps of locating an imaging sensor at an imaging plane in an optical path following the tertiary mirror and focusing only via movement of the secondary mirror.

16. An anastigmatic optics method comprising the steps of:
    placing primary, secondary, and tertiary mirrors wherein said primary and tertiary mirrors abut one another;
    employing a vertex common to the primary and tertiary mirrors at a junction of the primary and tertiary mirrors;
    adjusting the mirrors such that the tertiary mirror has a focal point which is off an alignment axis shared by all the mirrors, wherein the alignment axis intersects the vertex; and
    incorporating the mirrors in an optical system.

17. The method according to claim 16 wherein in the incorporating step the optical system is selected from the group consisting of hyperspectral imaging sensors, multispectral imaging sensors, infrared imaging systems, electro-optical targeting systems, and remote sensors.

* * * * *